United States Patent
Xiong et al.

(10) Patent No.: US 9,758,116 B2
(45) Date of Patent: Sep. 12, 2017

(54) APPARATUS AND METHOD FOR USE IN CONFIGURING AN ENVIRONMENT OF AN AUTOMOBILE

(71) Applicants: Sony Corporation, Tokyo (JP); Sony Network Entertainment International LLC, Los Angeles, CA (US)

(72) Inventors: True Xiong, San Diego, CA (US); Charles McCoy, Coronado, CA (US); Justin Gonzales, San Diego, CA (US); Prisciliano Flores, Spring Valley, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 128 days.

(21) Appl. No.: 14/152,797

(22) Filed: Jan. 10, 2014

(65) Prior Publication Data

US 2015/0197205 A1    Jul. 16, 2015

(51) Int. Cl.
*B60R 16/037* (2006.01)

(52) U.S. Cl.
CPC .................... *B60R 16/037* (2013.01)

(58) Field of Classification Search
CPC ....................................................... H04B 5/00
See application file for complete search history.

(56) References Cited

U.S. PATENT DOCUMENTS 5,633,484 A * 5/1997 Zancho ................. H04M 1/247
235/380
6,157,824 A * 12/2000 Bailey .................... G06Q 20/04
379/91.01

(Continued)

FOREIGN PATENT DOCUMENTS

| EP | 2273719 | 1/2011 |
|---|---|---|
| FR | 2946301 | 1/2010 |
| WO | 0222407 | 3/2002 |

OTHER PUBLICATIONS

BMW; "My BMW Remote—iOS"; http://content.bmwusa.com/microsite/connecteddrive_qa2/pdf/My_BMW_Remote_manual_iOS.pdf; Published Nov. 2012; 8 Pages.
Campbell et al.; "IBM and Sprint Velocity Drive Connected Car Into the Future"; http://www-03.ibm.com/press/us/en/pressrelease/41441.wss; Published Jul. 10, 2013; 3 Pages.
Bavarian Motor Works (BMW), "Car Memory/Key Memory", http://www.bmw.com/com/en/insights/technology/technology_guide/articles/car_key_memory.html, Jun. 25, 2013, p. 1.

(Continued)

*Primary Examiner* — Jonathan M Dager
(74) *Attorney, Agent, or Firm* — Fitch, Even, Tabin & Flannery LLP

(57) ABSTRACT

Some embodiments provide methods of configuring an automobile, comprising: identifying, through a controller of a first automobile, a first user of potential users, wherein the identifying comprises identifying that the first user is proximate the first automobile; accessing a first plurality of pre-sets that correspond to the first user, wherein each of the first plurality of pre-sets comprises a standardized setting configured to be implemented in multiple different types of automobiles that have different available capabilities, wherein the first plurality of pre-sets are configured to achieve substantially the same environmental conditions in each of the different types of automobiles regardless of differences; and automatically applying all of the first plurality of pre-sets without any user interaction such that each of the first plurality of pre-sets is applied at one time establishing the environment of the first automobile consistent with the first plurality of pre-sets.

20 Claims, 5 Drawing Sheets

(56) References Cited

U.S. PATENT DOCUMENTS

| | | | | |
|---|---|---|---|---|
| 6,622,083 B1* | 9/2003 | Knockeart | | G01C 21/362 |
| | | | | 701/420 |
| 7,616,129 B2 | 11/2009 | Thacher | | |
| 8,089,339 B2* | 1/2012 | Mikan | | G07C 9/00309 |
| | | | | 235/384 |
| 8,269,601 B2 | 9/2012 | Burzio | | |
| 8,326,259 B2* | 12/2012 | Gautama | | G08C 17/02 |
| | | | | 455/404.1 |
| 8,614,622 B2* | 12/2013 | Van Wiemeersch | | B60R 25/04 |
| | | | | 340/5.54 |
| 8,825,222 B2* | 9/2014 | Namburu | | G07C 9/00111 |
| | | | | 701/1 |
| 8,977,408 B1* | 3/2015 | Cazanas | | H04L 41/082 |
| | | | | 455/3.03 |
| 9,002,536 B2* | 4/2015 | Hatton | | B60R 25/24 |
| | | | | 340/426.13 |
| 9,014,888 B2 | 4/2015 | Sukkarie | | |
| 9,043,049 B2* | 5/2015 | Reich | | B60R 16/037 |
| | | | | 701/2 |
| 2003/0004897 A1* | 1/2003 | Smith, IV | | G06F 17/30867 |
| | | | | 705/76 |
| 2004/0090346 A1* | 5/2004 | Simonds | | B60L 11/1824 |
| | | | | 340/905 |
| 2004/0092253 A1* | 5/2004 | Simonds | | B60R 16/0315 |
| | | | | 455/414.2 |
| 2004/0093154 A1* | 5/2004 | Simonds | | B60R 16/0315 |
| | | | | 701/532 |
| 2004/0093155 A1* | 5/2004 | Simonds | | H04L 67/12 |
| | | | | 701/532 |
| 2004/0209594 A1* | 10/2004 | Naboulsi | | G08B 21/06 |
| | | | | 455/404.1 |
| 2005/0107132 A1* | 5/2005 | Kamdar | | B60R 25/1003 |
| | | | | 455/569.2 |
| 2008/0150685 A1 | 6/2008 | Desai | | |
| 2009/0271609 A1* | 10/2009 | Baskey | | H04L 67/306 |
| | | | | 713/100 |
| 2010/0036560 A1* | 2/2010 | Wright | | B60R 16/037 |
| | | | | 701/36 |
| 2010/0143872 A1* | 6/2010 | Lankteee | | G09B 19/167 |
| | | | | 434/65 |
| 2010/0233957 A1* | 9/2010 | Dobosz | | B60R 16/037 |
| | | | | 455/41.1 |
| 2012/0283894 A1* | 11/2012 | Naboulsi | | A61B 5/18 |
| | | | | 701/1 |
| 2013/0024060 A1 | 1/2013 | Sukkarie | | |
| 2013/0038437 A1 | 2/2013 | Talati et al. | | |
| 2013/0145360 A1 | 6/2013 | Ricci | | |
| 2013/0145401 A1 | 6/2013 | Ricci | | |
| 2013/0197674 A1* | 8/2013 | Lowry | | B60W 50/08 |
| | | | | 700/19 |
| 2013/0204455 A1* | 8/2013 | Chia | | G07C 5/008 |
| | | | | 701/1 |
| 2013/0297099 A1* | 11/2013 | Rovik | | B60R 16/037 |
| | | | | 701/2 |
| 2014/0049366 A1* | 2/2014 | Vasquez | | G07C 9/00857 |
| | | | | 340/5.54 |
| 2014/0222298 A1* | 8/2014 | Gurin | | B60W 50/085 |
| | | | | 701/49 |
| 2014/0379169 A1* | 12/2014 | Camacho | | B60R 16/037 |
| | | | | 701/2 |
| 2014/0380505 A1* | 12/2014 | Camacho | | G06F 21/31 |
| | | | | 726/28 |
| 2015/0057837 A1* | 2/2015 | Moore, Jr. | | G06Q 10/02 |
| | | | | 701/2 |
| 2015/0067805 A1* | 3/2015 | Martin | | H04W 12/06 |
| | | | | 726/7 |
| 2015/0126143 A1* | 5/2015 | Van Wiemeersch | | H04B 1/082 |
| | | | | 455/160.1 |
| 2015/0180710 A1* | 6/2015 | Cazanas | | H04L 41/082 |
| | | | | 709/221 |

OTHER PUBLICATIONS

Bavarian Motor Works (BMW), "Comfort access system", http://www.bmw.com/com/en/insights/technology/technology_guide/articles/comfort_access_system.html, Dec. 8, 2013, p. 1.

Bavarian Motor Works (BMW), "Drivers' Profiles", http://www.bmw.com/com/en/insights/technology/technology_guide/articles/driver_profile.html?source=index&article=driver_profile, Aug. 6, 2016, p. 1.

* cited by examiner

APPARATUS AND METHOD FOR USE IN CONFIGURING AN ENVIRONMENT OF AN AUTOMOBILE

BACKGROUND

1. Field of the Invention

The present invention relates generally to vehicles, and more specifically to configuring environments of vehicles.

2. Discussion of the Related Art

Vehicles continue to be an extremely important part of people's lives. The number of vehicles operated continues to increase. Similarly, the number of operators of vehicles continues to increase.

Vehicle manufacturers continue to increase and improve the features, options and complexity of vehicles. The features, options and complexity are increasing, at least in part, because manufacturers continue to try and improve their products, distinguish themselves over competitors and try to provide users with the features and options they want, that will improve performance and/or improve the vehicle.

SUMMARY OF THE INVENTION

Some embodiments provide methods of configuring an automobile in accordance with a user's preferences, comprising: identifying, through a controller of a first automobile configured to establish an environment of the first automobile, a first user of one or more potential users, wherein the identifying the first user comprises identifying that the first user is proximate the first automobile; accessing a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different available capabilities corresponding to at least one of automobile performance and user's comfort than the first automobile, wherein the first plurality of pre-sets are configured to achieve, when applied, substantially the same environmental conditions, relative to the pre-sets, in each of the different types of automobiles regardless of differences between the multiple different types of automobiles; and automatically applying all of the first plurality of pre-sets without any user interaction such that each of the first plurality of pre-sets is applied at one time establishing the environment of the first automobile consistent with the first plurality of pre-sets that correspond to the first user.

Additionally or alternatively, some embodiments provide methods of configuring an automobile environment of an automobile, comprising: identifying one or more pre-sets corresponding to a first automobile, wherein each pre-set of the plurality of pre-sets corresponds to automobile environmental conditions affecting one of a user's driving preferences and the user's comfort; automatically detecting one or more settings for each of the plurality of pre-sets; standardizing each of the settings of each of the plurality of pre-sets such that each of the settings is configured to be implemented in multiple different types of automobiles including the first automobile and at least one or more automobiles that have different available capabilities corresponding to at least one of automobile performance and user's comfort than the first automobile; and storing each of the standardized settings of each of the plurality of pre-sets such that the pre-sets are configured to be applied in configuring an automobile environment of the first automobile.

Still other embodiments provide apparatuses to configure an environment of an automobile, comprising: a processor configured to interact with one or more systems within an automobile to modify an environment within the automobile; and processor readable memory accessible by the processor and configured to store program code; wherein the processor is configured, when implementing the program code, to: automatically detect settings for each of a plurality of pre-sets corresponding to a first automobile, wherein each pre-set of the plurality of pre-sets corresponds to automobile environmental conditions affecting one of a user's driving preferences and the user's comfort; standardize each of the settings of each of the plurality of pre-sets such that each of the settings is configured to be implemented in multiple different types of automobiles including the first automobile and at least one or more automobiles that have different available capabilities corresponding to at least one of automobile performance and user's comfort than the first automobile; and store each of the standardized settings of each of the plurality of pre-sets such that the pre-sets are configured to be applied in configuring an automobile environment of the first automobile.

Still other embodiments provide apparatuses to configure an environment of an automobile, comprising: a processor configured to interact with one or more systems within an automobile to modify an environment within the automobile; and processor readable memory accessible by the processor and configured to store program code; wherein the processor is configured, when implementing the program code, to: identify, through a controller of a first automobile configured to establish an environment of the first automobile, a first user of one or more potential users, wherein the identifying the first user comprises identifying that the first user is proximate the first automobile; access a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different interior dimensions within passenger areas than the first automobile, wherein the first plurality of pre-sets are configured to achieve, when applied, substantially the same environmental conditions, relative to the pre-sets, in each of the different types of automobiles regardless of differences between the multiple different types of automobiles; and automatically apply all of the first plurality of pre-sets without any user interaction such that each of the first plurality of pre-sets is applied at one time establishing the environment of the first automobile consistent with the first plurality of pre-sets that correspond to the first user.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
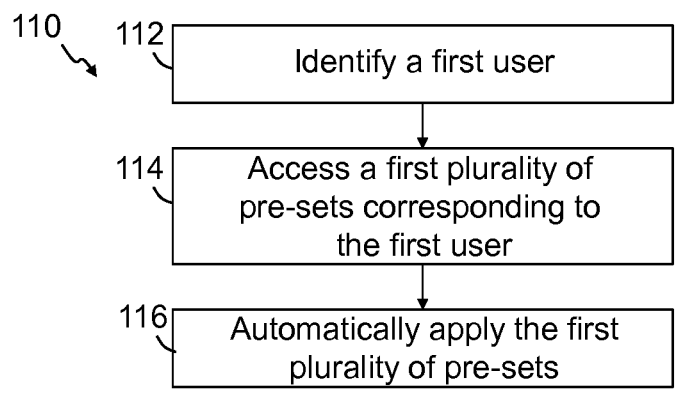
FIG. 1 shows a simplified flow diagram of an exemplary process configured to automatically apply pre-sets to configure an environment of a car, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Vehicles are configured with many capabilities (sometimes referred to as features) that correspond to vehicle performance (e.g., acceleration, fuel efficiency, safety, braking, restrictions, and other such capabilities), one or more users' comfort (e.g., seat position, steering wheel position, mirror(s) position, music content, entertainment content, volume level, and the like) and other such capabilities. Typically, one or more of these capabilities may be modified by a user to enable a user to configure an environment that correspond to and/or affect a user's operating or driving preferences and/or the user's comfort. Further, the environmental conditions are often not limited to a single user but can be applicable to multiple users or individuals within a vehicle. Some vehicles provide relatively large numbers of capabilities (e.g., options and/or automobile environmental conditions) that can be modified and/or set by a user that affect a user's driving preferences and a user's comfort.

An environment of a vehicle can comprise conditions, aspects and/or parameters that correspond to a user's operating or driving preferences, comfort, safety and other conditions of the car. The automobile environment can be configured according to environmental parameters and/or conditions that control the environment that correspond to and/or affect the user's driving preferences, comfort, safety, etc. For example, the environment can include an interior of a passenger area of an automobile, how the automobile performs, a user's ability to control the automobile, a user's ability to effectively interact with surroundings while driving the automobile, and the like. Examples of environmental conditions and/or parameters that correspond to, affect and/or control the automobile environment include, but are not limited to, position of one or more seats, positioning of one or more mirrors, positioning of the steering wheel, one or more temperatures within the passenger area, positioning and/or orientation of a display (e.g., automobile interface and/or navigation display), audio and/or content settings, communication settings, automobile performance conditions (e.g., whether speed restrictions are applied, automated braking reaction times, restrictions one whether the automobile will start, etc.), global positioning system (GPS) tracking of the automobile, and/or other such conditions. Other aspects of the automobile environment can include, for example, entertainment system settings, navigation system settings, child lock settings (e.g., door opening controls, window controls, etc.), lighting settings, transmission settings, suspension system settings, control of elements that change the vehicles appearance (such as decorations or signs), authorization to override particular settings, authorization to save changes to pre-sets and other such aspects.

Some embodiments provide pre-sets that correspond to one or more of these potential environmental conditions. The setting of components, conditions, elements or portions of the car that correspond to the environmental conditions can be identified and stored as one or more pre-set. These pre-sets can be used to automatically configure a vehicle environment so that a user does not have to make modifications in order to configure the vehicle environment in accordance with user's preferences. Although the above and below is generally described with reference to an automobile, the inventive aspects described herein can also be applied to substantially any car, truck, motorcycle, bus, motorhome or recreational vehicle (RV), airplane, train, boat, sports vehicles (e.g., golf cart, go cart, dune buggy, snow mobile, ATV, and jet ski, wave runners, etc.), work vehicles or equipment (e.g., fork lifts, back hoes, cranes, and bulldozers, where work vehicles are likely to be used by a group of operators that switch frequently, and are likely to have additional pre-sets or parameters that can be set), non-motorized vehicles, and/or substantially any other such vehicle. Accordingly, those skilled in the art will appreciate that the description below when referring to an automobile, car or vehicle is not limited to a car, but can be applied to substantially any vehicle.

FIG. 1 shows a simplified flow diagram of an exemplary process 110 configured to automatically apply pre-sets to configure an environment of a car, in accordance with some embodiments. In step 112, a controller, control system and/or control circuitry of a car identifies a user. The user may be a driver or a passenger. Similarly, the car may identify multiple users at or in the car at the same time (e.g., driver and one or more passengers). The identification of the user can be through one or more of numerous different ways. For example, a user can be identified by a key being used to unlock and/or start the car, a portable consumer electronic device carried by the user and with which the controller can communicate and/or detect (e.g., cellular phone, including smart phone, tablet, smart watch, smart key fob, etc.), through user interaction (e.g., pin number, user identifies herself by selecting an identifier from a listing of users displayed to the user, etc.), a weight of a user (where in some implementations a margin of error is used as people's weight tends to drift over time, and the person's clothing, contents of the person's pockets, and objects held by the person can also have a significant effect on the weight), facial recognition can be used to identify a user, other biometric identification can be used (e.g., fingerprint, palm or retina scan, etc.), voice recognition could be used to identify a person, a user may be identified by detecting other electronic devices carried by the user (e.g., a particular car key (even if not used to start the car), RFID chip (which might be in an ID badge (e.g., for work)), smart watch, a Bluetooth device, etc.), and/or other such methods or combinations of such methods. Additionally or alternatively, some embodiments present the user with identifiers of users or a listing of users (e.g., which may be presented and navigated through a variety of different user interfaces) and allow a user to select the user such that pre-sets associated with the selected user are applied. In some implementations, no security is employed when applying the pre-sets to ensure that a person is authorized to apply a preset, and a person can simply choose which presets to apply from a list or menu.

Similarly, some embodiments detect other users in the car and apply additional or alternative pre-sets based on the one or more other users' detected presence. For example, the vehicle may sense that one or more children are in car seats in the back seat. As such a pre-set may be activated that limits entertainment content available to the back seat (e.g., child appropriate content) and/or starts playing child appropriate content (e.g., cartoons) when the car is started, but if no children are detected the content will not be limited and/or cartoons will not be played. Again, this may be activated by having settings in a single preset, by having multiple presets, where the pre-set that plays the cartoons is not applied when children are not detected, or a different pre-set is selected based on different detected occupants of the vehicle.

In step 114, a plurality of pre-sets are identified that can be applied to configure an environment of the car and which have settings corresponding to the identified user. As introduced above, there can be any number of different pre-sets that can be used to configure the environment of the car that can have an effect on the user's comfort while in the car, user's operation of the car, performance of the car, and/or other such conditions that can affect an environment of the car. Each pre-set can correspond to one or more aspects of the environment. Similarly, each pre-set can have one or more settings. In some implementations, a single setting is applied relative to a pre-set, while other pre-sets may simultaneously apply multiple settings. Further, in many instances, the settings of pre-sets are different depending on the user. There are numerous pre-sets that can be set and applied, and these pre-sets are often different for different users. For example, a woman may set up an environment very differently than the way her husband sets up an environment, and both the woman and her husband may set up the environment very differently than their teenaged daughter sets up the environment.

Similarly, a car may include multiple environments or a car environment may have multiple environmental zones, with each environmental zone allowing different settings for the same one or more pre-sets (e.g., a temperature pre-set, an entertainment pre-set, seat position pre-set, and the like). For example, a temperature pre-set may allow multiple different temperature settings for different environmental zones (e.g., driver's environmental zone, front passenger's environmental zone, one or more rear passenger environmental zones, etc.). Some embodiments may have different pre-sets for different environmental zones. For example, there may be a driver's temperature pre-set, a front passenger temperature pre-set, and one or more rear passenger temperature pre-sets. Similarly, there may be one or more driver seat positioning pre-sets, while there are one or more different front passenger seat pre-sets and/or one or more rear passenger seat pre-sets.

Still referring to FIG. 1, in step 116, the controller automatically applies the pre-sets corresponding to the user. Accordingly, the controller can apply multiple pre-sets without any further user interaction. Based on the identified user, the controller implements the pre-sets to configure the environment to the user's preferences. As such, some embodiments configure an automobile in accordance with a user's preferences and/or apply one or more pre-sets to configure an environment corresponding to the car.

As introduced above, the pre-sets can correspond to any number of different conditions. For example, some pre-sets may include one or more pre-sets corresponding to seat position, other pre-sets may correspond to temperature within the passenger area, one or more other pre-sets may correspond to positioning of one or more mirrors, still other pre-sets may correspond to speed and/or acceleration limits, some pre-sets may correspond to information displayed to a user on display (e.g., navigation instructions, frequency of navigation instructions, zoom level of displayed maps, text messages, whether text messages are to be displayed, whether text messages are converted to audio, types of entertainment content to be made available and/or how entertainment content is accessed, if or when entertainment content is to be made available) which may be dependent on where the user is positioned within the car, one or more pre-sets may correspond to the use of and/or whether mobile phones (e.g., cellular or smart phones) are operational while the car is in use (may be different depending on where user is positioned within the passenger area), one or more pre-sets corresponding to parental ratings on entertainment content (e.g., children can only access content that meet rating, type of content, cannot watch certain movies, music, games, and/or other such restrictions), volume pre-set(s), other pre-sets may correspond to brightness of a display and/or dash board, one or more pre-sets may correspond to a steering wheel positioning, and/or substantially any other condition that can affect a user's comfort and/or operation of the car.

Similarly, in some embodiments the pre-sets may be dependent on various conditions and/or factors that are taken into consideration. For example, in some embodiments, one or more temperature pre-sets may be dependent upon and/or may be affected by a temperature outside the passenger area of the car may and/or such temperature may temporarily be affect the temperature pre-set, a temperature within the passenger area similarly may affect the temperature pre-set and/or may temporarily affect the temperature pre-set, a time of day or night may affect pre-sets, a user's current condition (e.g., detect the user is drowsy, excited, in a relaxed mood, etc.) may affect the settings of one or more pre-sets, and the like. As such, the automatic application of the pre-sets may, in some embodiments, take into consideration various factors and/or conditions. Further, in some embodiments, a pre-set may be associated with one or more settings, and the application of one or more of those settings may be dependent on various factors and/or conditions, while in other embodiments, a setting may be dependent upon one or more factors and/or conditions, such as being defined as a ratio, as a mathematical equation that takes into consideration one or more factors and/or conditions, or other such dependencies and/or combinations of such dependencies.

Further, the application of pre-sets is dependent upon having settings defined for the pre-sets. As such, may embodiments automatically acquire one or more settings for one or more pre-sets without the user having to specifically define the settings. Additionally or alternatively, a user may specifically define one or more settings for one or more pre-sets, and the controller can apply those user defined pre-sets. For example, a user may specifically define one or more radio stations as one or more pre-sets. Similarly, a user may position a seat of the car and instruct the controller to store one or more settings for one or more pre-sets that correspond to the current position of the seat. As another example, a parent user may define one or more pre-sets that are to apply to the parent's teenaged child when the teenaged child is the driving user. Additionally, some embodiments may modify user defined pre-sets based on tracking over time a user's interaction with the environment over time. For example, even though a user previously specifically defined a seat position, the controller may detect that the user changes the position of the seat one or more times, and based on the one or more changes may modify the settings of the one or more pre-sets. Again, in many embodiments and with at least some pre-sets, the defining and/or modifying one or more pre-settings and/or settings of pre-sets can be performed automatically without a user specifically instructing the controller and/or without further user interaction to cause the recording of a setting. Again, some pre-sets may apply to other users besides the driver. For example, there may be different pre-sets for one or more different passenger areas of the car.

Figure 2:
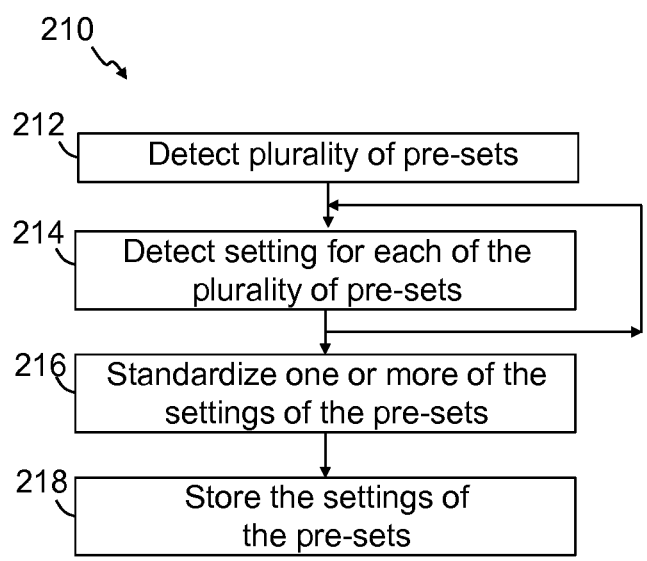
FIG. 2 shows a simplified flow diagram of an exemplary process configured to automatically set and/or acquire one or more settings for one or more pre-sets that are intended to be used to configure an environment of a car, in accordance with some embodiments.

FIG. 2 shows a simplified flow diagram of an exemplary process 210 configured to automatically set and/or acquire one or more settings for one or more pre-sets that are intended to be used to configure an environment of a car, in accordance with some embodiments. In step 212, the controller automatically identifies, detects and/or determines the one or more pre-sets that may be applicable and/or available relative to the car. The pre-sets that might be available may be dependent on the car, the user, operating conditions, previously defined and/or determined pre-sets, and/or other such factor. Again, the pre-set typically correspond to car environmental conditions that affect and/or are dependent upon a user's driving preferences, the user's comfort and/or combination thereof.

In step 214, one or more settings are automatically detected, determined and/or learned for one or more of the pre-sets. As described above, in some embodiments, the settings can be learned and/or modified over time. Accordingly, in some embodiments, the process 210 continues to automatically learn, monitor, track and/or detect settings, change settings and/or adjust the settings over time. As such, some embodiments learn desired settings and/or user's habits and can modify pre-sets to be consistent with detected or learned preferences. The modification and/or adjustment of settings may be based on user's changes to the environment and/or changes to one or more conditions that correspond to a pre-set and/or have an effect on a condition controlled by and/or that corresponds to a pre-set.

Further, the adjusting and/or modifying of a setting and/or a pre-set may be based on tracking changes over time. For example, some embodiments dynamically adjust one or more settings after a user makes a change a predefined or threshold number of times. Similarly, the changes may have to be within threshold changes. As an example, if a user modifies a location of a seat, one or more settings corresponding to one or more pre-sets for seat positions, the user may have to make seat adjustments three or more times before one or more settings are modified. Additionally or alternatively, the controller may restrict modifications to one or more settings for seat position pre-sets when the amount or degree of changes made by the user are within threshold amounts and/or are within threshold relationship (e.g., the change in position is not more than a threshold distance from the previous setting, the change is not more than a percentage change, etc.). Similarly, in some embodiments, the detected changes may additionally have to be detected within a threshold time and/or within a threshold number of times the car is occupied. These threshold changes can limit or avoid changing a setting when a user is incorrectly identified and/or inadvertently recognized as another user (e.g., friend borrowing the car).

In step 216, one or more of the settings of one or more pre-sets are standardized, and in some embodiments all of the settings are standardized. The standardization of setting comprises configuring and/or defining the settings such that each of the settings is configured to allow the setting to be implemented in multiple allowing different configurations and/or different types of cars that have different interior dimensions within passenger areas, and typically so that the pre-sets and/or settings when applied are configured to achieve substantially the same environmental conditions, relative to the pre-sets, in each of the cars and/or different types of cars regardless of differences in configurations and/or differences between the multiple different types of automobiles. Further, with many pre-sets the pre-sets and/or settings of the pre-sets are relationship dependent and/or defined according to relationships with other structures, elements and/or conditions of the car in which the pre-set is being applied.

For example, some embodiments define one or more seat position pre-sets. These seat position pre-sets can be defined not based on a specific location of a seat, but instead on a relationship of one or more portions of the seat relative to other components or elements of the car. As a specific example, in some embodiments, one or more seat pre-sets may be configured to establish one or more distance relationships between a seat within a car and one or more other physical features within the car, such as include a distance relationship between a front side surface of a back rest of the driver's seat and the surface (or plane defined by a portion of the surface) of the brake pedal and/or gas pedal upon which the user's foot contacts. Accordingly, the standardized distance seat pre-set achieves substantially the same distance relationship when implemented so that the user is positioned in substantially the same location relative to the brake pedal and/or the gas pedal regardless of the type of car and/or dimensions of a passenger area of the car. This is different than merely identifying a location of a seat positioned in a track in a car, as repeating this location information in a different car can result in a completely different location relative to the brake and/or gas pedal. For example, the standardized settings and/or settings of pre-sets can include one or more settings corresponding to one or more pre-sets that define one or more distance relationships between a seat and one or more other physical features within the car, and typically does not define a position of the seat on a corresponding seat track. Accordingly, the standardization of the settings and/or pre-sets allows the settings and/or pre-sets to be used in different cars while continuing to provide an environmental condition that is preferred by the user. Further, the standardizing can be applied to user defined or controller determined and/or modified settings and/or pre-sets.

In some embodiments, for example, standardize settings for a seat position and/or mirror positions, a distance from the back rest of the driver seat to the pedals, etc., can be adjusted to be substantially the same in different cars even though the shape of the driver's seats may be different. Further, the position of the steering wheel and/or angle of the seat can be adjusted to match a distance or orientation from the pre-sets. This should preserve the angle of the seat back to the extent possible given the range of motion in the car in which the pre-sets are being applied. The position of the driver's head can then be estimated and the angles of the mirrors can be set such that the view is the same as in the car the pre-sets were set in, given a similar estimate of head position. Some embodiments further allow the pre-sets to be fine-tuned for a particular vehicle to account for positioning and other preference differences that were not accounted for through the standardization or that are due to differing preferences of the user when in different cars. When differentiated in such a way the same pre-set can define or have a different geometry depending on with which car the pre-set is being applied. For example, in a car where the seat is low to the ground, the person may prefer a more vertical seat back than in a car where the seat is further from the ground.

Still referring to FIG. 2, in step 218, the one or more settings for the one or more pre-sets are recorded and/or stored such that the pre-sets are configured to be applied in configuring a car environment of a car in which the user is in and/or in which the use intends to enter. The storage of the settings and/or pre-sets may comprise storing in memory in the car and accessible by the controller. In some implementations, the storing of the settings and/or pre-sets can comprise storing the settings and/or pre-sets in memory in a key and/or a key fob used to open the car and/or start the car.

Additionally or alternatively, the settings and/or pre-sets may be stored on one or more user's portable consumer electronic device (e.g., smart phone, tablet, laptop computer, or other such relevant device or combination of such devices). Still further, some embodiments may additionally or alternatively store the settings and/or pre-sets in user's home computer, such as when the car is capable of communicating (e.g., wired or wirelessly) with the home computer. In some embodiments, the settings and/or pre-sets may additionally or alternatively be stored in a remote database, server or the like, which may be accessed by the car (e.g., wired or wireless), accessed by the user's portable consumer electronic device (e.g., mobile phone, smart phone, tablet or the like), or otherwise be accessed directly or indirectly by the car.

As described above, some or all of the pre-sets and/or the settings of the pre-sets are standardized so that they can effectively be implemented in various different cars regardless of variations in dimensions of the cars, the cars' passenger areas, placement of components of the car (e.g., mirror location(s)) and/or other such factors. In some embodiments, the standardization merely includes defining the setting in accordance with a predefined format, such as defining distances in millimeters instead of inches, defining dimensions based on three dimensions, defining temperature in Fahrenheit instead of Celsius, and/or other such formats In other instances and/or with some pre-sets, the standardization can comprise defining the setting and/or pre-set as dependent on one or more relationships. As described above, some settings may be defined as distances between two or more components and/or features on or within the car. Similarly, some settings may be dependent on distances between multiple components or features of the car (e.g., distance between seat and both the brake pedal and the gas pedal; distance between a seat rest of the drive seat and a rear view mirror as well as a distance from a portion of a front side surface of the back rest of the drive seat and the rear view mirror). The standardization of some settings may define and/or include one or more angular relationships between two or more components or features. For example, a setting corresponding to a mirror position pre-set may be defined as an angular relationship between a surface of the mirror (e.g., defined by a central point defined by area of the mirror, or a plane defined by the surface of the mirror) and a point or plane defined by a portion of the front surface of the back rest of the driver seat. As another example, the separate setting for the mirror pre-set and/or separate pre-set for the mirror may include an angular relationship between a plane defined by the surface of the mirror and a plane anticipated to be defined by a road on which the car is to travel when all four wheels are in contact with the road. Similarly, the standardization of temperature settings and/or pre-sets may be based at least in part on one or more temperature relationships. For example, a temperature pre-set may be dependent upon a temperature outside the passenger area and/or a temperature inside the passenger area.

Accordingly, some embodiments take into consideration differences in dimensions of the passenger area of automobiles relative to dimensions of passenger areas of other automobiles by standardizing one or more settings. Some embodiments may also take into consideration differences in exterior dimensions between cars and/or other relative dimensions. For example, some embodiments are configured to take into consideration relative differences in distance between a surface of a seat rest relative to the road on which the car is to travel versus the distance between a surface of a seat rest of another care relative to the road, and/or take into consideration relative difference in a user's position relative to the road when the user is seated within an automobile and when the user is seated within another automobile. Other relationships can include, but are not limited to a distance relationship between a back rest and a mirror, angular relationships between a surface of a mirror relative to one or more planes defined by portions of a back rest, seat rest, a horizontal plane substantially parallel with a surface of a road on which the car is intended to travel, a vertical plane defined by a portion of the back rest and/or other such distance and/or angular relationships.

Figure 3A:
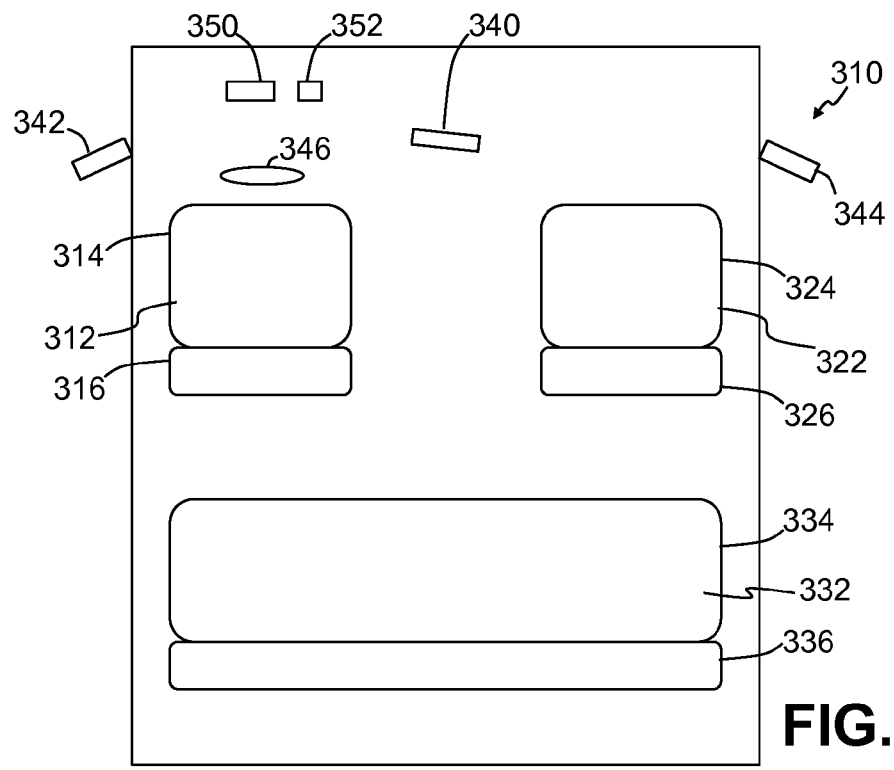
FIG. 3A illustrates a simplified block diagram, overhead view of an exemplary passenger area or compartment, in accordance with some embodiments.

FIG. 3A illustrates a simplified block diagram, overhead view of an exemplary passenger area or compartment 310, in accordance with some embodiments. In this example, the passenger compartment includes a driver's seat 312 with a seat rest 314 and a back rest 316, a front passenger seat 322 with a seat rest 324 and a back rest 326, a rear seat 332 with a rear seat rest 334 and a back rest 336, a rear view mirror 340, a driver's side mirror 342, a passenger side mirror 344, a steering wheel 346, a brake pedal 350 and a gas pedal 352. As will be apparent to the reader, the car typically includes numerous other features, such as a dash board, interior temperature controls, radio and other such features. Further, as will be apparent to the read, the car may additionally include other features, such as an interior control system (e.g., controls temperature, provides playback of entertainment content, provides navigation, etc.), an entertainment system, a navigation system, one or more displays cooperated with the controller, the navigation system, the entertainment system, the interior control system and/or other such system or circuitry, and/or other such features.

Figure 3B:
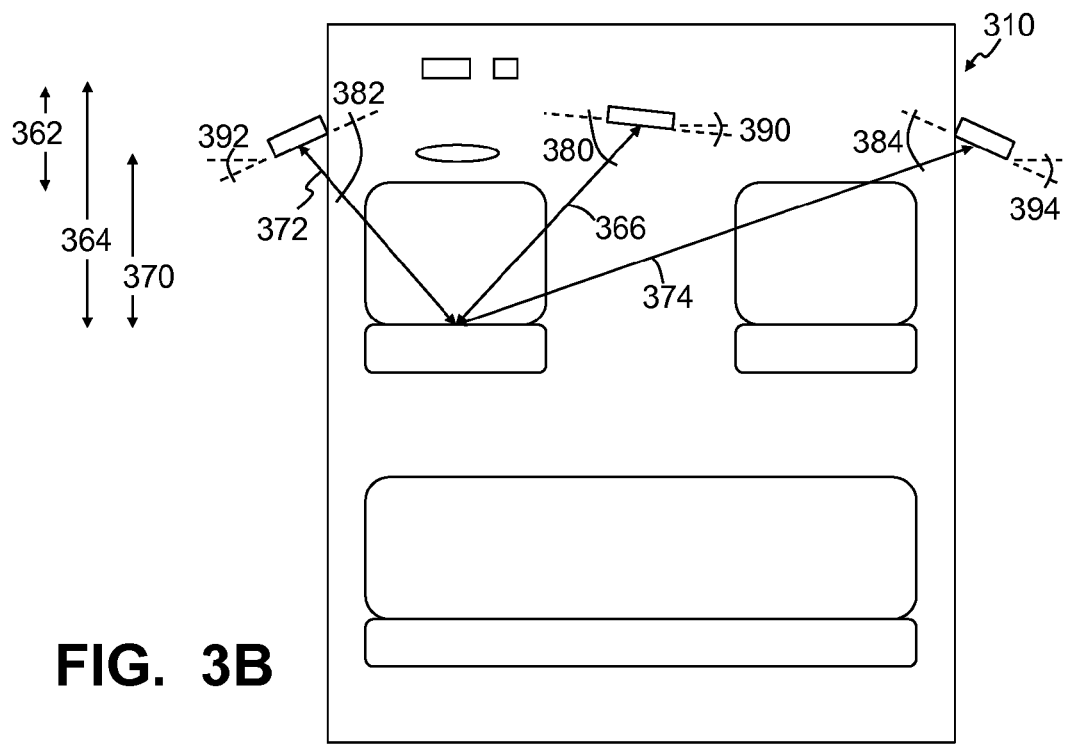
FIG. 3B illustrates the simplified block diagram, overhead view of the exemplary passenger area or compartment of FIG. 3A further illustrating representative examples of standardized settings of pre-sets defined according to relationships, in accordance with some embodiments.

FIG. 3B illustrates the simplified block diagram, overhead view of the exemplary passenger area or compartment 310 of FIG. 3A further illustrating representative examples of standardized settings of pre-sets defined according to relationships, in accordance with some embodiments. For simplicity, reference numbers in FIG. 3B only refer to the settings, while FIG. 3A shows reference numbers of components of the passenger area 310. It is noted that FIG. 3B illustrates only some example representations of standardized settings of pre-sets, and those skilled in the art will appreciate that numerous other settings of numerous pre-sets can also be defined. In this example, a first setting 362 of a seat position pre-set is configured to establish or defines a distance relationship between a front surface of the driver's seat rest 314 and a surface of the brake pedal 350.

Another example setting 364 corresponds to a distance relationship between a front surface of the back rest 316 of the driver's seat 312 and the surface of the brake pedal 350. A third setting 366 corresponds to a distance relationship between a central point or axis of the front surface of the back rest 316 (e.g., according to an area of the front surface of the back rest) and a central point of a surface of the rear view mirror 340 (e.g., according to an area of a surface of the rear view mirror). A fourth setting 370 corresponds to a distance relationship between the back rest (e.g., the central point of the front surface) and the steering wheel 346 (e.g., a central point defined an intersection of a horizontal and vertical planes extending through the steering wheel). A fifth setting 372 corresponds to a distance relationship between a central point or axis of the front surface of the back rest 316 and a central point of a surface of the driver side mirror 342 (e.g., according to an area of a surface of the rear view mirror). A sixth setting 374 corresponds to a distance relationship between a central point or axis of the front surface of the back rest 316 and a central point of a surface of the passenger side mirror 344 (e.g., according to an area of a surface of the rear view mirror).

A seventh setting 380 corresponds to an angular relationship between a line or plane defined between a central point or axis of the front surface of the back rest 316 and a central axis of the rear view mirror, and a plane defined by a surface of the rear view mirror 340. An eighth setting 382 corresponds to an angular relationship between a plane or line defined between central point or axis of the front surface of the back rest 316 and a central axis of the driver side mirror, and a plane defined by a surface of the driver side mirror 342. A ninth setting 384 corresponds to an angular relationship between a plane or line defined between central point or axis of the front surface of the back rest 316 and a central axis of the driver side mirror, and a plane defined by a surface of the passenger side mirror 344.

A tenth setting 390 corresponds to an angular relationship between a plane defined by a surface of the rear view mirror 340 and a horizontal plane (e.g., defined generally perpendicular to a direction of travel of the car when moving forward in a straight line). A eleventh setting 392 corresponds to an angular relationship between a plane defined by a surface of the driver side mirror 342 and the horizontal plane. A twelfth setting 394 corresponds to an angular relationship between a plane defined by a surface of the passenger side mirror 344 and the horizontal plane. Again, numerous additional or alternative standardized settings and/or pre-sets can be defined. FIGS. 3A-3B illustrate a few representative examples, and should not be viewed as a complete or exhaustive listing. Accordingly, in some embodiments, at least some pre-sets are not specific distances, angles, etc., but instead are dependent on, for example, size, shape, configuration of an interior of the car (e.g., distance from seat to steering wheel, distance from seat to gas pedal, distance from seat to dash display, distance from seat to mirror, etc.). Further, some implementations may add one or more seat positions for specific vehicles or models of vehicles.

Figure 4:
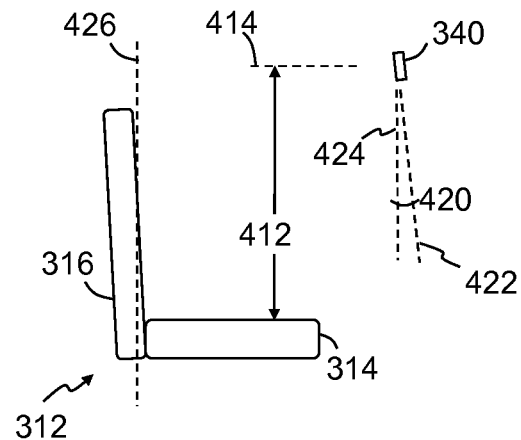
FIG. 4 shows a simplified side view of a driver's seat and illustrates examples of standardized settings, in accordance with some embodiments.

FIG. 4 shows a simplified side view of a driver's seat 312 with the seat rest 314 and back rest 316 in relation to a rear view mirror 340, and also illustrates examples of standardized settings, in accordance with some embodiments. A thirteenth representative standardized setting 412 corresponds to a distance relationship between a first or top surface of the seat rest 314 and a central axis 414 of the rear view mirror 340. A fourteenth representative standardized setting 420 corresponds to an angular relationship between a plane 422 defined by a surface of the rear view mirror and a vertical plane 424 (or a plane parallel with a plane 426 passing through a central axis of the back rest 316).

Other standardization can be applied to some if not all of the other pre-sets. For example, some standardization can be applied to entertainment pre-sets, such as radio pre-sets, streaming content pre-sets, and/or other such entertainment pre-sets. As a specific example, the controller can standardize radio pre-sets by identifying specific radio stations often listened to by a user and/or set by a user. Based on the identified radio stations and/or source of entertainment content, the controller (through internal processing and/or through communication with one or more remote sources, such as remote database, server and/or website) can identify and store other characteristics corresponding to the radio station or other entertainment content. This other information can further be defined and/or organized according to a hierarchy and/or priority. Some of the other information may include, but not limited to, a "type" or genre of radio station (e.g., contemporary, classical, news, talk radio, comedy, rock, alternative, rap, etc.), artists/performer(s), type of news (e.g., sports, political, current events, entertainment, etc.), time of day user accesses, production company, director, and other such additional information or combinations of such information.

This standardization can be used by a system controller to identify corresponding radio stations and/or entertainment sources. For example, when a user is in a different car or different location than typical, the pre-sets can be modified according to the standardization to identify another source of entertainment content. Further in this regard, for example, when the user is outside the range of radio stations near the user's home, the system controller can identify one or more other radio stations that correspond to one or more of those radio stations the user typically listens to. A hierarchy may also be applied. For example, if a user typically listens to news radio (e.g., NPR), the controller may identify a different broadcast station in a current location that broadcasts NPR, and if that cannot be identified, identifying another broadcast source for current news, and if that cannot be identified another broadcast source for talk radio or political talk radio, etc. This standardization can similarly be applied when a user is not in her/his own vehicle, such as with a rental car or when borrowing a friend's car. Because of the standardization, the controller can configure the car even though the car may be vastly different than the car a user is typically in. Further, one or more pre-sets can be defined for one or more sources of content, such as radio stations, websites, wireless sources (e.g., television, gaming source, and the like) and/or other such sources. As described above, settings and/or pre-sets may include information corresponding to content to be received, which can include, but is not limited to, genre, listing of artists, listing of subject matter covered (e.g., entertainment news, sports, sports news, comedy, political, political satire, etc.), identification of the source, etc. Further, some embodiments prioritize standardized information and apply pre-sets in accordance with the priority (e.g., apply specific radio station, if not available, identify radio station that plays identified artists, if not available, identify radio station that plays music within same genre, etc.).

In some embodiments, not every setting and/or pre-set is standardized. Some settings do not need to be standardized or changed. For example, standardizing a temperature may simply be the recognition that the temperature is in Fahrenheit. In other instances, it may include converting a temperature from Fahrenheit to Celsius. Similarly, the standardizing of a brightness of a dash board may simply be a level of brightness, while in other instances there may be an association of brightness relative to dimensions of a dash board, number of lighted elements displayed in a dash board, relationship to ambient light within the passenger compartment, relationship to ambient light outside the car, etc.

As a further example, pre-sets can be applied to similar cars having similar interiors while having different capabilities (e.g., different engines, suspensions, and/or other aspects of the car). As one specific example, the pre-sets can apply to a fuel efficiency mode in two cars of the same dimensions where one car has a 6-cylinder engine and the other has a 4-cylinder engine. Accordingly, one or more of the standardized pre-sets can configure the operation of the engine to achieve the desired fuel efficiency. As such, the different cars apply engine adjustments according to some standardized pre-sets differently for each vehicle. Similarly a pre-set for setting radio stations could be applied to the navigation system in one vehicle and to a radio in another vehicle of the same dimensions that does not have a navigation system. Accordingly, standardized settings can be configured, in some embodiments, to be implemented in multiple different types of automobiles including that have different available capabilities corresponding to one or more of automobile performance, one or more users' comfort, operation, range, time of use, and other such capabilities.

As described above, the pre-sets and corresponding settings can be stored on memory in the car, in a key fob, in a user's portable device, in a remote database, server, computer or the like. The car and/or the pre-set controller is configured to access the pre-sets and apply the pre-sets in configuring the environment of the car. Similarly, the car and/or pre-set controller can be configured to store one or more pre-sets and/or settings for pre-sets in a key fob, user's portable device, database, server, computer, etc.

Figure 5:
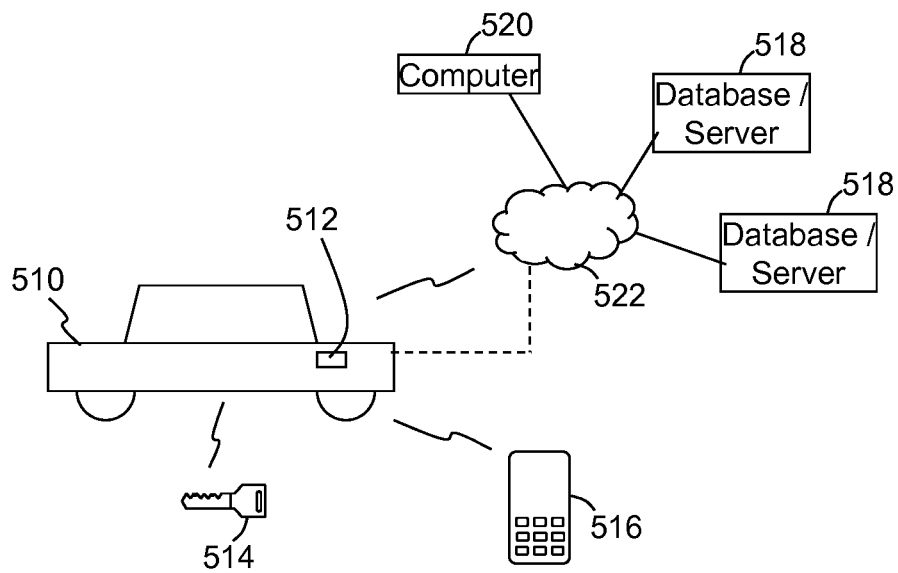
FIG. 5 shows a simplified block diagram of an exemplary system comprising a car with a controller in communication with one or more sources for storing and/or retrieving pre-sets and/or settings of one or more pre-sets, in accordance with some embodiments.

FIG. 5 shows a simplified block diagram of an exemplary system comprising a car 510 with a controller 512 in communication with one or more sources for storing and/or retrieving pre-sets and/or settings of one or more pre-sets, in accordance with some embodiments. The controller 512 is configured to implement one or more pre-sets. Further, in some embodiments, the controller can be a stand-alone pre-set controller configured to implement pre-sets, while in other embodiments, the controller provides further functionality to the car.

In some embodiments, the car 510 and/or controller 512 is in communication with a key fob 514, user's portable device (e.g., user's smart phone 516), one or more databases and/or servers 518, a computer 520, or other such device or devices or a combination of such devices. The car or controller of the car can, in some implementations, communicate with the key fob 514 via direct communication using the key as a communication medium, and/or wirelessly (e.g., RFID, IR, Wi-Fi, and the like). In some instances, the key fob is at least partially powered by the car, for example when inserted into the ignition. Similarly, in some embodiments, the car can communicate with a user's portable device 516 via Wi-Fi, Bluetooth, cellular, optical (e.g., IR, fiber optic, etc.), USB interface, and/or other such wireless or wired communication. In some embodiments, the car can additionally or alternatively communicate with the one or more databases and/or server 518 and/or the computer. The communication can be over a local and/or distributed network 522 (e.g., LAN, WAN, Internet, etc.), which can include wired, wireless or combination of wired and wireless communication.

Through the communications with one or more of the key fob, the user's portable device 516, the database and/or server 518, the computer 520 or other devices, the car is able to store and/or access pre-sets, receiving updates to pre-sets, receive new pre-sets and/or program code to store and apply new pre-sets (e.g., firmware update), and the like. Once received through an identification and/or communication, the pre-sets may be applied by the car and/or controller 512. For example, a car rental company may establish communications with one or more cars at a particular location to provide and/or retrieve pre-sets. As a further example, when a frequent customer arrives at a car rental location to picks up a car, a computer system of the car rental company (whether local or remote) may communicate to the car (through wired or wireless communication) to deliver and/or have one or more pre-sets applied corresponding to the renter that is assigned to that car of a plurality of available cars.

Further, in some embodiments, the controller can utilize the communication with one or more of the key fob 514, the user's portable device 516 or the like in attempts to identify the user. As described above, once identified the controller can identify one or more pre-sets corresponding to the user and automatically configure the car environment accordingly.

In some embodiments, one or more servers and/or databases manage pre-set information and is configured to communicate that information directly or indirectly to one or more cars. The pre-set information may additionally include information on how to recognize a user and the corresponding one or more pre-sets that should be applied. Similarly, one or more cars can communicate new pre-sets and/or modifications to existing presets (including customizations for the particular vehicle) back to the server and/or database. Similarly, in some embodiments, two or more cars may be communicatively coupled with each other (e.g., through cellular, Bluetooth. WiFi, radio frequency (RF), wired, or other such communication). The cars (or corresponding controllers 512) can be configured to send and/or receive pre-set information directly from one car to another car and/or daisy-chain communications between multiple cars (e.g., multiple cars at a car rental company, through a fleet of cars, etc.). In some embodiments, pre-set information may be transmitted over airwaves, such as by radio frequencies. A car or controller 512 can use a tuner to monitor one or more particular frequencies such that it can detect when pre-set information is being transmitted that is directed to the car (e.g., identifying an identifier within the communication). The car can then update local pre-set information with the pre-set information from the transmission (e.g., a rental car lot that pushes a renter's pre-sets to a car when the renter is assigned to a particular car).

The identification and/or modification of pre-sets and/or settings of pre-sets is not limited to those detected by the controller. In some embodiments, the user can specifically define and/or modify one or more settings and pre-sets through interaction with the car and/or through communication with the car (e.g., through an Application (APP) on a user's portable device, through software and/or an interface on a computer, through an Internet site, or through other such user interfaces). For example, in some embodiments, the car can provide options to the user to allow the user to set one or more pre-sets through one or more buttons in the car, through a display and/or user interface (e.g., touch screen, buttons, track ball, joy stick, etc.).

In some embodiments, a user can obtain an APP on the user's smart phone, other portable device, computer, etc. that communicates either directly or indirectly with the car. The APP can display a user interface that identifies one or more pre-sets and one or more corresponding settings. In some embodiments, the user interface may display different icons corresponding to different pre-sets and/or different categories of pre-sets. In some instances, the displayed pre-sets and/or settings may be limited (e.g., limited to those that can be modified by the user), while in other instances the display may not be limited. Additionally or alternatively, the user interface may distinguish those pre-sets and/or settings that may be modified by a user from those that cannot be modified by a user. Typically, the pre-sets are displayed based on some organization and/or hierarchy (e.g., level 1 categories: driver, front passenger, one or more rear passengers; level 2 sub-categories: seat position/orientation pre-sets, mirror position/orientation pre-sets, dash board pre-sets, display pre-sets, entertainment pre-sets, temperature pre-set(s), driving/performance pre-sets, tracking pre-sets, etc.; with one or more other levels or layers of sub-categories to the level 1 or level 2 sub-categories).

The APP, user interface or the like may require user authentication before allowing a user to modify some or all of the pre-sets or settings. Further, there may be multiple user's that are authorized to modify a user's pre-sets and/or settings, and in some instances one or more users may have higher priority and/or access rights than one or more other users. For example, a parent may have full authorization to set and/or modify pre-sets for a child, while the child has limited authority to modify only a sub-set of the pre-sets.

Further, the APP, Internet site, local program or the like can be configured to communicate with the car or cooperate with other software configured to communicate with the car. As such, some or all of the current settings for some or all of the pre-sets can be obtained and accessible to the user. Similarly, the APP, Internet site, local program or the like can communicate the user specified pre-sets and/or modifications to pre-sets to the car to be implemented when relevant. Again, the car may store some or all of the pre-sets, may obtain some and/or may obtain some or all of the pre-sets from another source (e.g., key fob 514, user's portable device 516, database and/or server 518, computer 520, etc.), or a combination thereof.

Figure 6:
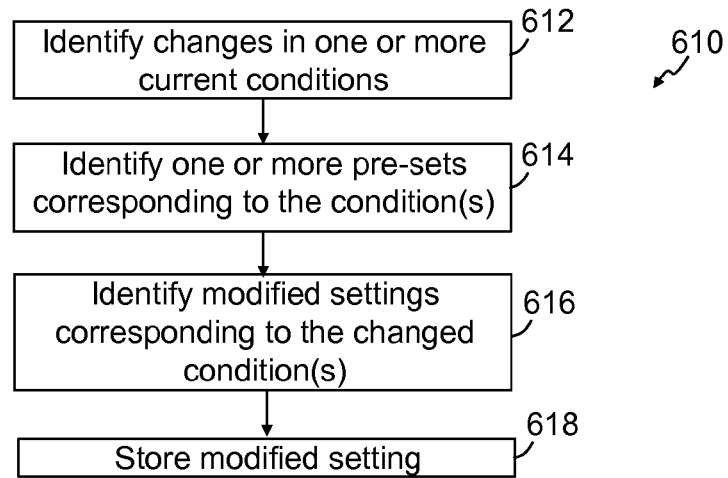
FIG. 6 shows a simplified flow diagram of an exemplary process of obtaining and/or modifying pre-sets, in accordance with some embodiments.

In some embodiments, as described above, the pre-sets and/or settings may automatically and/or manually be modified in response to a user's actions over time, adjusted based on detected and/or changed conditions, changed because of updated information, changed in response to user specified change, and/or changed for other relevant reasons. FIG. 6 shows a simplified flow diagram of an exemplary process 610 of obtaining and/or modifying pre-sets, in accordance with some embodiments. In step 612, one or more changes to one or more current conditions are identified. The changes can be changes that alter environmental conditions affecting one of a user's driving preferences and the user's comfort.

In step 614, one or more pre-sets are identified that correspond to the changes initiated by the user. Again, if the user changes a temperature, one or more pre-sets corresponding to a temperature are identified. In step 616, the changes and/or modifications to settings associated with the identified pre-sets and corresponding to the identified pre-sets are identified. In some instances, the changes are identified as changes relative to previous conditions, changes relative to a predefined parameter, different settings are determined (e.g., different standardized distances and/or angles), and the like. In some embodiments, conditions are also identified that are associated with the detected changes. For example, a time of day may be tracked, a time of year may be determined, weather conditions may be taken into consideration, and/or other such factors. This may also be considered with the settings and/or associated with other settings corresponding to one or more pre-set and/or other pre-sets.

In step 618, one or more settings for one or more pre-sets corresponding to the changed conditions are stored. In some instances, this includes storing over previous settings. In other instances, additional settings may be stored corresponding to a pre-set (e.g., multiple different settings may be associated with a pre-set or set of pre-sets, such as temperature setting during winter verse temperature setting versus summer). In some embodiments, the modifications to the settings may not be stored until conditions and/or thresholds are met. For example, some embodiments may evaluate the changes and determine whether similar changes have been made a threshold number of times and/or during similar conditions and/or within threshold conditions. Similarly, some embodiments identify that one or more changes initiated by the user are consistent with at least one or more previous changes previously initiated by the user, and store the adjusted settings of the in response to identifying that the one or more changes initiated by the user is consistent with one or more previous changes previously initiated by the user. Additionally, some embodiments are configured to disregard a change or modification if the detected change is relatively large and/or a relatively large deviation, and consider the change as an exceptional situation and/or not considered to be an adjustment or an intended adjusting to the pre-set. Further considerations may be taken into account, such as other passengers in the car, estimated user's mood (e.g., based on music and/or entertainment content selections, driving characteristics, time of day/night, etc.). The modified settings can then be applied.

Multiple settings may be defined for one or more pre-sets with conditions and/or factors dictating which of the multiple settings are applied. For example, in some implementations multiple temperature settings may be defined for one or more temperature pre-sets that can vary depending on temperatures outside the passenger area, within the passenger area and/or a ratio between outside and inside the passenger area. As a specific example, first temporary temperature setting may be dependent upon an outside temperature and/or inside temperature, while a second temperature setting is based on user specified and/or learned desired temperature. The first temperature setting may initially be applied and then a transition to the second setting may occur, for example, following a period of time, based on a temperature ratio etc. A timing to transition setting may be defined and associated with the temperature pre-set dictating a time between first temporary temperature setting and a transition to the application of the second temperature setting, which may be dependent on a difference or variation of inside and/or outside temperature relative to, for example, the second temperature setting, learned over time, predefined timing; etc.

As another example, one or more pre-sets may be modified based on a time of day and/or night, time a user has been in and/or using the car, type of driving and/or driving conditions, and other such factors or conditions. Settings of one or more pre-sets may be modified from a first set of one or more settings to a second set of one or more settings based on a time of night and/or a duration that the user has operated the car. As a specific example, it may be detected that it is later at night and/or a user has been driving for an extended period of time and as such one or more settings corresponding to a user's comfort may be modified so that a user may be less comfortable and thus likely to be more alert (e.g., adjusting the back rest so that the driver is more upright, adjusting a temperature so that it is cooler, increasing an airflow directed at the driver, changing a type of music that is played back such that it is more lively and/or upbeat, or other such changes and/or combination of such changes to one or more settings and/or pre-sets). Similar modifications to one or more settings and/or pre-sets may be made based on detected driving conditions (e.g., temperature, weather forecast information, occurrences of deceleration and acceleration, variations in speed, etc.). In other instances, it may be learned that at the end of the day a user is more tired and sits lower in the seat. Accordingly, one or more of the mirror positioning pre-sets can be automatically modified and implemented to move the one or more mirrors to compensate for the user's different sitting position.

Additionally, one or more pre-sets and/or settings for pre-sets may be applicable for different portions of the passenger area. For example, there may be one or more temperature settings for temperature pre-sets corresponding to an area of the passenger compartment around the driver's seat, one or more temperature settings for temperature pre-sets corresponding to an area of the passenger compartment around the front passenger seat, and one or more temperature settings for temperature pre-sets corresponding to one or more areas of the passenger compartment around the one or more rear passenger seats. Similarly, entertainment settings for a front portion of the passenger compartment than the settings for the rear portion of the passenger compartment. As such, the pre-sets can be partitioned, for example, defined relative to designated partitions within the passenger area. Further, the application of the settings is often dependent on an identification of a user in the relevant area of the passenger compartment. Accordingly, multiple different settings of one or more pre-sets can simultaneously be applied, such as for different areas of the passenger compartment.

As described above, in some embodiments, the car can recognize a key and/or key fob and through that recognition at least in part identify a user. In some instances, a key may include one or more buttons that notify the car of the user (i.e., driver 1 button, and driver 2 button). Further, some cars do not require the car key to be removed from a user's pocket to open the car door and/or start the engine. Accordingly, some embodiments are configured to recognize a key fob (or other such device) carried by the user when the key fob is proximate to or within the car. Accordingly, a user can be identified simply by the user possessing the key fob or other such device. Similarly, other users (e.g., passenger) may be identified as the other user could utilize a separate key fob or other device by possessing the separate key fob or other device, which the car may be able to distinguish from other key fobs.

In response to recognizing the key fob (e.g., detecting the selection of one of the buttons, through RFID, direction communication, etc.), the car can automatically apply one or more pre-sets. Similarly, in some embodiments, the car can include one or more physical user or pre-set buttons and/or there can be virtual user or pre-set buttons or menu items that the user can select in a user interface presented by the car, such as on a touch screen display. In some instances, the car implements one or more of the multiple pre-sets before the user inserts the key into the ignition and/or even opens the door (e.g., moving the seat back for a taller driver). A key fob may additionally or alternatively include different buttons for different situations (e.g., summer and winter). In other instances, the car may include different pre-sets and/or different settings for one or more pre-sets that are dependent upon conditions (e.g., weather, time of day, time of year, etc.). Similarly, the car can learn pre-sets. For example, based on prior user action, in summer the car can automatically start the car and activate the air conditioning (and/or open one or more windows) even before the user enters the car. Further, the controller may learn that a user leaves for work typically about 7:50 AM, and accordingly, in the winter start the car at 7:46 AM and activate the heater and/or defrost. This auto-starting may further take into consideration current temperature (using a thermometer of the car) and/or weather (e.g., communicating with a remote weather server).

Further, some embodiments organize pre-sets, define a hierarchy or prioritize the pre-sets, and/or define interrelationships between pre-sets. As such, in some implementations the application and/or modification of a pre-set may affect one or more other pre-sets, and in some instances may affect some lower level or priority pre-sets while not affecting higher level or priority pre-sets. For example, the controller may detect that a user changes a position of the driver's seat 312. In some embodiments, based on the change to the seat, the controller can determine proportional position changes to one or more mirrors 340, 342, 344. As another example, the controller may detect a change to in music or a radio station that a user is listening to, and automatically adjust a seat positioning and/or recline based on the user's predicted mood.

Again, changes to one or more settings of one or more pre-sets can be temporary changes, or stored settings can be modified such that the modified settings are subsequently applied. In the above example, the controller may identify relevant changes settings corresponding to one or more seat position pre-sets and the corresponding changes to settings regarding mirror positioning pre-sets, and record the modified settings to be implemented in subsequent pre-set activations. As described above, the controller may consider one or more thresholds before modifying the settings. In some embodiments, a pre-set can specify one or more settings for particular parameters while not modifying other parameters that other pre-sets specify.

Further, a pre-set can be a collection of pre-sets, and in some instances one or more pre-sets can additionally specify an ordering in which a set of pre-sets is applied (e.g., the last of multiple pre-sets specifying settings for parameters will be used to set that particular parameter).

As introduced above, some embodiments utilizing one or more settings of one or more pre-sets in identifying cars that are likely to be more comfortable and/or provide a user with a better driving experience. This evaluation and/or filtering can be applied by car manufacturers, car dealerships, rental car companies, etc. In some instances, recommendations and/or restricted options may be applied based on one or more pre-sets and/or the settings for one or more pre-sets.

Figure 7:
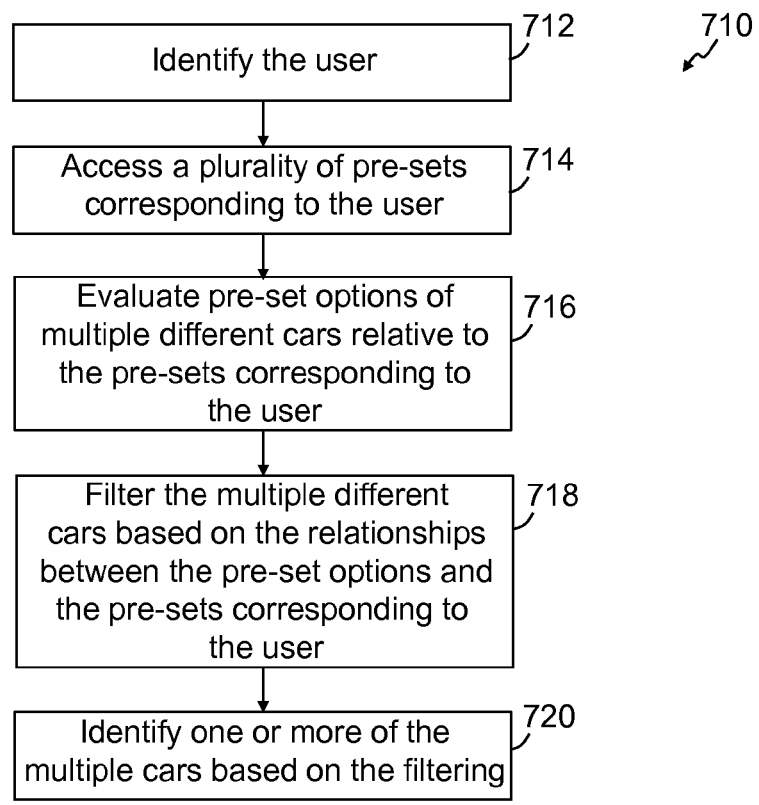
FIG. 7 shows a simplified flow diagram of an exemplary process that can be applied in evaluating and/or filtering potentially available cars, in accordance with some embodiments.

FIG. 7 shows a simplified flow diagram of an exemplary process 710 that can be applied in evaluating and/or filtering potentially available cars, in accordance with some embodiments. In step 712, a user is identified. In some embodiments, this identification can be based on the user herself or another person (e.g., an employee of a car rental company) typing in a user name and/or other identification (e.g., user name, password, credit card number, customer number, phone number, address, or the like, or combinations thereof). In other embodiments, a control system may obtain some identification information from the device a user is accessing a service (e.g., computer or smart phone used to access a car rental company website). In yet other embodiments, a control system may automatically communicate with a user's portable device (e.g., smart phone). For example, when a user gets within range of a rental car company location, a computer at the company may detect a user's smart phone (e.g., via Wi-Fi) and initiate communication, and based on a response identify the smart phone and/or the user (e.g., based on a smart phone ID and/or information provided by the smart phone in response to the communication).

In step 714, a plurality of pre-sets are identified that correspond to the user. These pre-sets can include one or more of the pre-sets described above and/or below, and/or can include other pre-sets. For example, a car rental company may include pre-sets such as manufacturer preference, color preference, rental car class (e.g., economy, standard, luxury, convertible, etc.), expected price range, performance, gas mileage, and/or other such pre-sets. Similarly, one or more of these additional pre-sets may also include location specific (e.g., convertible in southern California), time dependent (e.g., all-wheel drive in winter), and/or have other dependencies or combinations of such.

In step 716, the one or more pre-sets are evaluated relative to one or more pre-set options for the multiple different cars that are available or can be made available that correspond to the user and the user's pre-sets. In some embodiments, this evaluation can take into consideration multiple different users' pre-sets (e.g., pre-sets of a husband and wife, pre-sets of two different users on a business trip together, etc.). Accordingly, the evaluation may apply prioritizes to the different pre-sets and/or the different users. Further, the priorities may be weighted differently depending on the different users (e.g., which user typically drives) and/or the different pre-sets (e.g., allowing separate sets of temperature pre-sets for driver's side and passenger side). In step 718, the multiple cars are filtered based on the relationships between the pre-sets corresponding to the user and/or users. In step 720, one or more of the multiple cars are identified or selected based on the filtering and/or based on the relationship between the one or more of the pre-sets and the different available automobiles. Further, the one or more identified cars can be made available for use by the user (e.g., rental car company can assign an identified car to the user and/or allow a user to select from the one or more identified cars).

The one or more identified cars may limit the cars made available to a user (e.g., user is particularly tall and thus smaller sized cars are not made available to that user) and/or may prioritize available cars. The process 710 can be performed when the user arrives at the car rental company location and/or performed prior to the user arriving so that more cars are available that are more likely to match when it is known the user will be arriving.

Similar filtering can be applied at car dealerships in identifying cars that a user is more likely to buy. The service can determine which car choices that do not comply with the pre-sets (e.g., have a range of motion that do not permit the dimensions specified in the pre-sets) or cannot accommodate one or more of the pre-sets. This would be especially useful for very tall or very short people who find that they do not comfortably fit in many vehicles. Car manufacturers may also utilize filtering, for example, on a website, and/or in determining cars to manufacturer and/or locations to where cars should be shipped.

Further, as described above, once the car is assigned to the user the pre-sets can be implemented by the car controller to configure the car environment. Because of the car filtering, the implementation of the multiple pre-sets should provide the user with a desired environment. In some embodiments, a controller or processor of the car is configured to identify a user of one or more potential users, for example, identifying that the user is proximate the car. Further, the car in identifying the user may be configured to identify that the user is assigned to the car from a plurality of available cars. For example, when a user is assigned a car by a car rental company, assigned a work car from a fleet of potential cars (e.g., as part of beginning a work shift or work assignment) or otherwise assigned the car, the car can detect that the user proximate the car is assigned to that car and implement the one or more pre-sets.

Again, the standardizing of the pre-sets allows the pre-sets to be implemented by different cars having different capabilities (e.g., configurations, sizes, shapes, features and the like). Typically, the standardization is not limited to a manufacturer, but instead can be generic to substantially any manufacturer and/or any car that is configured to apply pre-sets. The application of the pre-sets is typically automatic, without requiring a user to request that the multiple pre-sets be implemented. Instead, the pre-sets are automatically applied, and typically in response to identifying the user. Further, the pre-sets applied by a car may not be limited to a single user, but instead can be applied to different users, and in some implementations may simultaneously apply pre-sets corresponding to multiple different users (e.g., simultaneously applying driver pre-sets, front passenger pre-sets, one or more rear passenger pre-sets).

As introduced above, some pre-sets may establish limits on a car operation and/or performance. For example, some of these pre-sets may be set by a user to conserve gas and/or limit potential tickets, while in other instances a parent of a teenage driver may set restrictions. Some implementations may allow a user to define and/or may learn to apply a speed regulation pre-set that limits a speed of the car. The speed limit pre-set may be dependent on other pre-sets such as location pre-sets (e.g., when in residential areas the speed is less than when on a highway). Similarly, some embodiments may provide for an acceleration regulation pre-set that limits a rate of acceleration, which can conserve gas. Some embodiments may detect whether one or more other passengers and/or non-authorized users (e.g., a non-sibling) are in the car. In response the pre-set can dictate that the car not start, communicate a notification (e.g., to a parent) and/or take other action. One or more pre-sets may set limits on locations where a car is allowed to travel, limits on distance of travel, and/or define boundary restrictions. The car user may notify the driver of the restrictions as the restriction is approached and/or exceeded, may notify others not in the car and/or take other action. Some embodiments may provide pre-sets that activate or deactivate tracking of a car (e.g., GPS location, speed, acceleration, braking, etc.), which can be stored and/or communicated to one or more people (e.g., employer, parents, law enforcement), servers and/or services.

Other pre-sets can apply and/or monitor other conditions relative to other restrictions. For example, one or more pre-sets may be set by law enforcement (e.g., pre-sets that require a driver to submit to a breathalyzer test prior to allow the car to be started). One or more pre-sets may define curfew restrictions, location restrictions and the like, and in some instances some pre-sets (e.g., curfew restrictions) may further be dependent on other pre-sets (e.g., dependent on where the car is located at time user tries to start the car). Some embodiments may include pre-sets that attempt to improve a driver's abilities, improve a driver's response to driving and/or driver conditions, and other such pre-sets that improve performance and/or safety. For example, the car may detect that a user is tired (e.g., based on speed variations, change to steering, time of night, etc.) and activate one or more pre-sets (e.g., turn on the air conditioning, adjust the seat position, etc.).

Still other pre-sets may limit content and/or information available to a driver. Some embodiments provide one or more pre-sets that may restrict and/or prevent social information from being received, played back and/or viewed, convert text to audio, and the like. As such, pre-sets can dictate methods of providing access, whether receiving or transmitting, to social network, news feeds, text messages, notifications, etc. Further, one or more pre-sets may restrict access to such information, for example, displaying information onto a dashboard to a driver, when the car is moving and/or moving at or above a certain speed state and/or safety state. This can potentially increase LTE capability, and/or help to reduce the number of accidents as a result of increased use of smartphones in the cars.

In some embodiments, one or more pre-sets can be configured to enable queuing a user's social network, news feeds, text messages, notifications, etc. and provide access to this information (e.g., display them) when the car had come to a speed state such as stopped, below 2 MPH, etc. or obtained a safety state, where it is believed that at such state the user has the mental capability to interact with and/or view the incoming information, feeds, notifications, etc. When the vehicle exceeds the certain speed setting (e.g., such as 3 MPH), the incoming information is not provided to the user and/or is queued until the car again reaches the restricted state. This can provide functionality for users to stay connected and at the same time reduce distractions (e.g., caused by texting-while-driving).

In some embodiments, before presenting the information the driver, the system utilizes and/or applies one or more of the following criterion: speed, the vehicle geo-location, current acquired distances of its position relative to other vehicles in the vicinity via sensors, road difficulty degrees from an external source, etc. Some embodiments include one or more safety pre-sets defining safety conditions and/or define a safety grade based on the criterion data (e.g., A, B, C, D, F) and use the safety grade to determine whether or not to provide access to the information (e.g., display the news/notifications). One or more threshold safety grades and/or safety conditions (e.g., a threshold speed, abrupt changes in direction, abrupt changes in speed, etc.) may be configured by the users, parents, governmental agency, car manufacturer, insurance agency, etc. In some embodiments, the system monitors the safety grades and/or conditions given to the car and/or driver and at some probability of unsafe/dangerous grade and/or condition(s), the system limits the range of speed threshold and/or other condition threshold. For example, when threshold speed is set at 10 MPH, the system consistently calculates F grading based on all the data above. The grade may vary depending on the type and/or format for which the information is provided and/or transmitted.

Further, some embodiments can be configured to monitor a user's interactions with devices configured to allow communication (e.g., with the dash board) to see if there are deviations, discrepancies, actions, etc. by the driver such as skidding, crossing over lanes, accelerated brakes or turns, etc. Based on this monitoring, the criterion and/or levels of the criterion can be modified and reflected in the safety grading. In addition, some embodiments can obtain biometric data from the driver via external source such as bio-reading steering wheels, facial recognition camera, etc. to determine whether or not a driver is in the right state (e.g., alert) to receive, view and interact with the information (e.g., smart phone, dash board apps, content, etc.). In some implementations, the system can also trigger the display of messages after the vehicle has been stationary for a given period (e.g., 5 seconds) of time. This would allow drivers to read messages when stopped at a red light, but would not distract drivers with messages when briefly stopped at a stop sign or in heavy traffic. Accordingly, some embodiments, in automatically applying one or more pre-sets, are configured to apply one or more safety pre-sets that define one or more safety conditions corresponding to when content can be made available to a user and queuing content until the one or more safety conditions are satisfied. Again, some embodiments determine whether one or more determined safety grades meet and/or exceed one or more thresholds, whether one or more safety conditions meet and/or exceed one or more thresholds, and/or other such safety evaluations.

Figure 8:
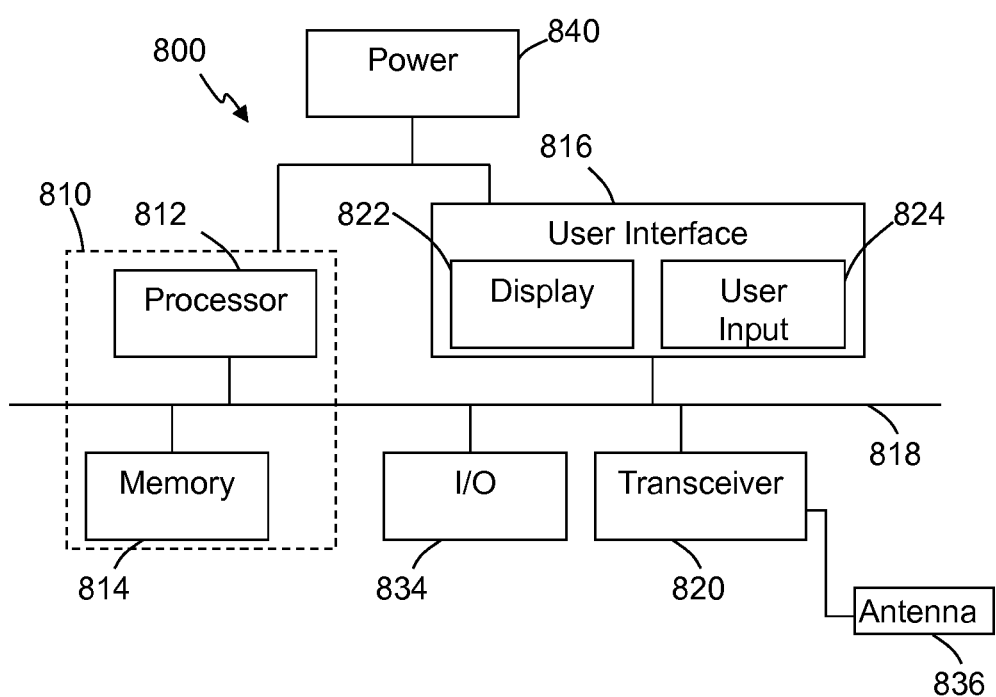
FIG. 8 illustrates a simplified block diagram of an exemplary system 800 for use in implementing methods, techniques, devices, apparatuses, systems, servers, sources and the like in obtaining, tracking, implementing and/or modifying pre-sets used to establish a car environment, in accordance with some embodiments.

The methods, processes, techniques, systems, devices, services, servers, sources and the like described herein may be utilized, implemented and/or run on many different types of devices and/or systems. Referring to FIG. 8, there is illustrated a system 800 that may be used for any such implementations, in accordance with some embodiments. One or more components of the system 800 may be used for implementing any system, apparatus or device mentioned above or below, or parts of such systems, apparatuses or devices, such as for example any of the above or below mentioned car controller 512, sever, database, cellular phone, smart phone, computer and the like. However, the use of the system 800 or any portion thereof is certainly not required.

By way of example, the system 800 may comprise a controller or processor module 812 and memory 814. In some embodiments, the system optionally includes a user interface 816, and one or more communication links, paths, buses or the like 818. A power source or supply 840 is included or coupled with the system 800. The controller 812 can be implemented through one or more processors, microprocessors, central processing unit, logic, local digital storage, firmware and/or other control hardware and/or software, and may be used to execute or assist in executing the steps of the methods and techniques described herein, and control various communications, programs, content, listings, services, interfaces, etc. The user interface 816 can allow a user to interact with the system 800 and receive information through the system. In some instances, the user interface 816 includes a display 822 and/or one or more user inputs 824, such as one or more buttons, touch screen, keyboard, a remote control, track ball, joy stick, etc., which can be part of or wired or wirelessly coupled with the system 800.

Typically, the system 800 further includes one or more communication interfaces, ports, transceivers 820 and the like allowing the system 800 to communication over a distributed network, a local network, the Internet, communication link 818, other networks or communication channels with other devices and/or other such communications. Further the transceiver 820 can be configured for wired, wireless, optical, fiber optical cable or other such communication configurations or combinations of such communications.

The system 800 comprises an example of a control and/or processor-based system with the controller 812. Again, the controller 812 can be implemented through one or more processors, controllers, central processing units, logic, software and the like. Further, in some implementations the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory 814 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store code, software, executables, pre-sets, settings, relationships between pre-sets, priorities, hierarchy information, scripts, data, content, multimedia content, programming, programs, media stream, media files, textual content, identifiers, log or history data, user information and the like.

One or more of the embodiments, methods, processes, approaches, and/or techniques described above or below may be implemented in one or more computer programs executable by a processor-based system. By way of example, such a processor based system may comprise the processor based system 800, a computer, smart phone, tablet, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for obtaining, applying and/or modifying pre-sets. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: identifying, through a controller of a first automobile configured to establish an environment of the first automobile, a first user of one or more potential users, wherein the identifying the first user comprises identifying that the first user is proximate the first automobile; accessing a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different interior dimensions within passenger areas than the first automobile, wherein the first plurality of pre-sets are configured to achieve, when applied, substantially the same environmental conditions, relative to the pre-sets, in each of the different types of automobiles regardless of differences between the multiple different types of automobiles; and automatically applying all of the first plurality of pre-sets without any user interaction such that each of the first plurality of pre-sets is applied at one time establishing the environment of the first automobile consistent with the first plurality of pre-sets that correspond to the first user.

Other embodiments provide one or more computer-readable storage mediums storing one or more computer programs configured for use with a computer simulation, the one or more computer programs configured to cause a computer and/or processor based system to execute steps comprising: identifying one or more pre-sets corresponding to a first automobile, wherein each pre-set of the plurality of pre-sets corresponds to automobile environmental conditions affecting one of a user's driving preferences and the user's comfort; automatically detecting one or more settings for each of the plurality of pre-sets; standardizing each of the settings of each of the plurality of pre-sets such that each of the settings is configured to be implemented in multiple different types of automobiles including the first automobile and at least one or more automobiles that have different interior dimensions within passenger areas than the first automobile; and storing each of the standardized settings of each of the plurality of pre-sets such that the pre-sets are configured to be applied in configuring an automobile environment of the first automobile.

Some embodiments allow vehicle owners to create and/or a vehicle to learn custom sets of pre-set profiles, for multiple users of the vehicle, which can automatically be activated (and in some instances be applied in a single action). Vehicle pre-sets can apply to seat positions, heating and air conditioning settings, wheel position, display settings, entertainment and navigation settings, etc., and can be set when creating a pre-set profile and/or incorporated into the pre-set profile over time as detected and/or modified.

Some embodiments provide pre-sets corresponding to seat positions, mirror orientation and/or directions, heating and AC pre-sets, mapping of stations to music and/or radio presets, mapping of video content sources, entertainment and/or navigation system settings (e.g., angle of orientation of a display of an entertainment and/or navigation system display; brightness; language; type of voice (male, female. English, southern, Irish, etc.); zoomed-in preference in displaying a map; types of direction instructions; frequency of direction instructions; whether traffic is indicated; destinations to select from, etc.), steering wheel position, display settings (e.g., language, miles per hour vs. kilometers per hour, font size, brightness, etc.), operation settings, such as economy mode vs. sporty mode, user interface settings (e.g., speed alerts, navigation information settings, whether the vehicle beeps when locked with a dongle key press, etc.), control over one or more cameras (e.g., a back-up cam and dash cam (including camera recording)), control communication of captured video audio, and/or still images (e.g., such as uploading captured video, audio, or still images to a server, transfer video, audio and/or image to a device (such as the user's cell phone), etc.), portable device communication and/or pairing (e.g., phone Bluetooth pairings, Wi-Fi pairing, etc.), window and/or sun-roof positions, headlights, running lights, and/or fog lights pre-sets, and other such pre-sets and pre-sets profiles. Further, the pre-sets can be made secure by using a RFID chip, a personal identification number (PIN), code or other such identifier, request confirmation of a determined identification, and/or other such identifiers that can be managed across two or more cars, and in some instances across a fleet of vehicles.

Cars continue to provide more flexibility and continue to get more complex than they used to be. Often vehicle settings were limited to manual and physical controls. Vehicles now typically include one or more processors and/or computers providing many user controllable options, which are often buried in menus that may or may not be accessible to a typical user. Cars continue to get more sophisticated and include motorized seats and mirrors, which can allow a controller, processor and/or computer control over their position. Even the radio in cars is likely to be integrated with a GPS navigation system, Bluetooth link to a cell phone (e.g., smart phone), and even menus for the car's functionality. Accordingly, some embodiments take advantage of the functionality available providing pre-sets that dictate the setting of an environment in accordance with one or more users' preferences. Pre-sets can control a vast number of vehicle settings that the user can set and/or can be determined by the controller of the car or a remote service or server (e.g., car manufacturer service that at least periodically communicates with the car, a user's smart phone that forward information from the car, etc.).

As such, some embodiments allow the pre-sets to be programmable by one or more users, learned by the car and/or programmed by a third party source when relevant. In some embodiments, the pre-sets have the ability to set a wide variety of vehicle settings in a single action. Security in provided in some implementations so a first user knows that another user did not re-program one or more pre-sets corresponding to the first user. Further, the pre-sets can be coordinated across multiple different vehicles. Some embodiments further allow for one or more default pre-sets, default pre-set profiles and/or default settings, which may allow a vehicle to automatically put back a wide variety of settings to the way they were at a particular point in time. Again, some pre-sets may be hierarchical so that one pre-set is based on or at least partially dependent one or more other pre-sets.

In some implementations, one or more pre-sets can be based on one or more other pre-sets (e.g., a first pre-set is defined as a difference relative to a second pre-set). For example, a pre-set can be defined at least in part as a relationship between a factory settings and a current settings (e.g., defined by the differences in relationship between current and factor settings). Additionally or alternatively, many if not all of the pre-sets are often standardized, which allows the pre-sets to be utilized across multiple different cars having different dimensions, shapes, etc., and typically across different manufacturers. Further, some pre-sets are configured to set some of the controllable settings while leaving other controllable settings unmodified. As a further example, some embodiments provide one or more sets of pre-sets containing many distance and/or angle relationships, one or more sets of pre-sets may additionally or alternatively contain one or more sets of positioning information where each set of positioning information corresponds to how the elements of a particular vehicle or model of vehicle is to be set when applying the pre-set. While positioning information may correspond to the overall dimensional information, the user may have modified the positioning of elements for the application of the pre-set to a particular vehicle. One or more sets of positioning information may optionally contain dimensional information on the dimensions and/or angles that result when the one or more sets of positions are set in the vehicle or vehicles with which it applies.

Again, some embodiments allow pre-sets to be locked and/or correspond to user (e.g., based on a key, which may be physical, such as an RFID chip, or may be a secret, such as a PIN number). This allows protected presets to be defined and not worry that the presets were modified by another user of the vehicle. This could be beneficial, for example, with parents who do not want to worry about their child modifying their preset when they borrow the car. This can also be beneficial with car rental companies as they can have multiple pre-set profiles and/or pre-sets with settings that they wish to have for vehicles when they rent it out to different users, as well as pre-sets for employs that may have to move or transport the cars. They can apply those settings by selecting the pre-sets or pre-set profile and/or the car can identify the user and set the pre-sets without having to worry about what a renter has re-programmed. This would allow a car rental company to easily have a consistent experience for customers picking up a rental car. Similarly, pre-sets could be coordinated across a fleet of vehicles. For example, a police department can synchronize all of their cars to a database of pre-sets. This allows an officer to get into any of the departments cars and apply their personal pre-sets to customize the vehicle environment to their preferences in a single action.

In some embodiments, a pre-set can leave the settings unchanged for settings that are not specified in the pre-set. A pre-set can also be easily and quickly created to set all controllable settings to their current settings. Similarly, a vehicle can automatically create temporary pre-sets for the previous set of values when the doors are unlocked. This allows someone to use a car and then easily and quickly put everything back to the way it was before they used it.

As described above, some embodiments identify the user, for example, through a key, user PIN or password, user's cellular phone (e.g., smart phone) or other such identification. The controller can passively apply pre-sets and/or take actions in response to the identification. The controller can differentiates between different keys that operates the same lock, and take programmable actions in response to the use of a key. The vehicle can take different actions depending on which key/dongle was used to lock, unlock, and/or start the vehicle. Further, additional buttons on a key or dongle may trigger specific programmable actions. In some instances, a key fob, dongle, etc. may only have buttons to trigger programmable options. Security can be provided through a master key, PIN, password or the like in order to reprogram the actions taken for a particular key and/or button. Other embodiments may alternatively or additionally include dash board buttons specifically to trigger programmable actions. Some embodiments may allow extra buttons to be programmed and/or added to the key fob or dongle for a car so that each button can be programmed individually. The same additional button on two different dongles would still be distinguishable by the vehicle so they can be programmed to different actions or the same action (e.g., for DUI offenders, they can have a special ignition key that requires a breathalyzer check to start the vehicle, while other users of the vehicle can use a different ignition key that does not require the check). Further, a dongle can be made with just one or more buttons that trigger programmable actions. Such a dongle could be given to someone without giving them access to functionality that would otherwise require a key, such as starting the vehicle or unlocking the trunk.

Some embodiments take advantage of keys having chips in them to electronically identify the key. The car could distinguish such keys as being separate distinct keys even if the metal part of the key is cut identically. When programming the vehicle to respond to a key, the programming can be specified for that particular key or for any key that operates the lock. This could also be implemented by cutting different keys and having the lock operational by all of the cut keys. This would be similar to master key schemes.

In some embodiments, methods are provided for use in configuring an automobile in accordance with a user's preferences. These methods comprise: identifying, through a controller of a first automobile configured to establish an environment of the first automobile, a first user of one or more potential users, wherein the identifying the first user comprises identifying that the first user is proximate the first automobile; accessing a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different interior dimensions within passenger areas than the first automobile, wherein the first plurality of pre-sets are configured to achieve, when applied, substantially the same environmental conditions, relative to the pre-sets, in each of the different types of automobiles regardless of differences between the multiple different types of automobiles; and automatically applying all of the first plurality of pre-sets without any user interaction such that each of the first plurality of pre-sets is applied at one time establishing the environment of the first automobile consistent with the first plurality of pre-sets that correspond to the first user.

Further, some embodiments provide methods of configuring an automobile environment of an automobile, comprising: identifying one or more pre-sets corresponding to a first automobile, wherein each pre-set of the plurality of pre-sets corresponds to automobile environmental conditions affecting one of a user's driving preferences and the user's comfort; automatically detecting one or more settings for each of the plurality of pre-sets; standardizing each of the settings of each of the plurality of pre-sets such that each of the settings is configured to be implemented in multiple different types of automobiles including the first automobile and at least one or more automobiles that have different interior dimensions within passenger areas than the first automobile; and storing each of the standardized settings of each of the plurality of pre-sets such that the pre-sets are configured to be applied in configuring an automobile environment of the first automobile.

Some embodiments provide an apparatus to configure an environment of an automobile, comprising: a processor configured to interact with one or more systems within an automobile to modify an environment within the automobile; and processor readable memory accessible by the processor and configured to store program code; wherein the processor is configured, when implementing the program code, to: identify, through a controller of a first automobile configured to establish an environment of the first automobile, a first user of one or more potential users, wherein the identifying the first user comprises identifying that the first user is proximate the first automobile; access a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different interior dimensions within passenger areas than the first automobile, wherein the first plurality of pre-sets are configured to achieve, when applied, substantially the same environmental conditions, relative to the pre-sets, in each of the different types of automobiles regardless of differences between the multiple different types of automobiles; and automatically apply all of the first plurality of pre-sets without any user interaction such that each of the first plurality of pre-sets is applied at one time establishing the environment of the first automobile consistent with the first plurality of pre-sets that correspond to the first user.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of configuring an automobile in accordance with a user's preferences, the method comprising:
    identifying, through a controller of a first automobile configured to establish an environment of the first automobile, a first user of one or more potential users, wherein the identifying the first user comprises identifying that the first user is proximate to the first automobile;
    accessing a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different available capabilities corresponding to at least one of automobile performance and user's comfort than the first automobile, wherein the first plurality of pre-sets are configured to achieve, when applied, substantially the same environmental conditions, relative to the pre-sets, in each of the different types of automobiles regardless of differences between the multiple different types of automobiles;
    automatically applying all of the first plurality of pre-sets without any user interaction such that each of the first plurality of pre-sets is applied at one time establishing the environment of the first automobile consistent with the first plurality of pre-sets that correspond to the first user;
    detecting a change initiated by the user that alters the environment corresponding to a setting of a first pre-set of the first plurality of pre-sets and that affects at least one of the user's driving preferences and the user's comfort;
    identifying at least a second pre-set of the first plurality of pre-sets that is related to the first pre-set based on the standardization;
    automatically adjusting a setting of the second pre-set proportional to the change initiated by the user; and
    automatically applying the adjusted setting of the second pre-set without any further user interaction.

2. The method of claim 1, wherein the accessing the first plurality of pre-sets comprises receiving the first plurality of pre-sets from a portable consumer electronic device in communication with the controller.

3. The method of claim 1, further comprising:
    detecting changes initiated by the user that alter one or more of environmental conditions affecting at least one of the user's driving preferences and the user's comfort;
    identifying one or more of the first plurality of pre-sets that correspond to the changes initiated by the user;
    automatically adjusting one or more settings of the one or more of the first plurality of pre-sets that correspond to the changes initiated by the user based on the changes initiated without further user interaction to initiate the adjusting; and
    storing the adjusted one or more settings of the one or more of the first plurality of pre-sets that correspond to the changes initiated by the user.

4. The method of claim 1, further comprising:
    identifying that the change initiated by the user is consistent with at least a previous change previously initiated by the user; and
    storing the adjusted settings of the second pre-set in response to the identifying that the change initiated by the user is consistent with the previous change previously initiated by the user.

5. The method of claim 1, further comprising:
    evaluating multiple different available automobiles in relation to one or more of the first plurality of pre-sets; and
    selecting the first automobile from the multiple different available automobiles based on a relationship between the one or more of the first plurality of pre-sets and the different available automobiles.

6. The method of claim 1, wherein the standardized settings of each of the first plurality of pre-sets comprises a first setting corresponding to a first pre-set configured to establish one or more distance relationships between a front surface of a back rest of a first seat within the first automobile and one or more other physical features within the first automobile.

7. The method of claim 1, wherein the identifying the first user comprises identifying a key carried by the first user.

8. The method of claim 1, wherein the automatically applying all of the first plurality of pre-sets comprises applying a safety pre-set defining safety conditions when content can be made available to a user and queuing content until the safety conditions are satisfied.

9. A method of configuring an automobile environment of an automobile, the method comprising:
    identifying one or more pre-sets corresponding to a first automobile, wherein each pre-set of the plurality of pre-sets corresponds to automobile environmental conditions affecting one of a user's driving preferences and the user's comfort;
    automatically detecting one or more settings for each of the plurality of pre-sets;
    standardizing each of the settings of each of the plurality of pre-sets such that each of the settings is configured to be implemented in multiple different types of automobiles including the first automobile and at least one or more automobiles that have different available capabilities corresponding to at least one of automobile performance and user's comfort than the first automobile; and
    storing each of the standardized settings of each of the plurality of pre-sets such that the pre-sets are configured to be applied in configuring an automobile environment of the first automobile;
    recognizing a second user is at least proximate the passenger area of the first automobile;
    identifying a second set of the standardized settings of each of a second plurality of pre-sets corresponding to the second user;
    applying the second set of the standardized settings of each of the second plurality of pre-sets; and
    configuring the environment of a portion of the first automobile corresponding to the passenger area in accordance with the second set of the standardized settings of each of the second plurality of pre-sets such that the environment of the passenger area of the first automobile is consistent with the second user's comfort.

10. The method of claim 9, wherein the standardizing each of the settings of each of the plurality of pre-sets comprises defining a first setting corresponding to a first pre-set as a distance relationship between a first seat within the first automobile and one or more other physical features within the first automobile.

11. The method of claim 10, wherein the distance relationship comprises the distance relationship between a front surface of a back rest of the first seat and a brake pedal of the first automobile.

12. The method of claim 10, wherein the distance relationship comprises the distance relationship between the first seat and a mirror of the first automobile, and wherein the defining the first setting comprises defining one or more angular relationships between a surface of the mirror relative to one or more planes defined by portions of the first seat.

13. The method of claim 10, wherein the standardizing each of the settings of each of the plurality of pre-sets comprises defining a second setting comprising one or more angular relationships corresponding to a surface of a mirror of the first automobile relative to one or more planes defined by one or more portions of the first seat.

14. The method of claim 9, wherein the automatically detecting the settings for each of the plurality of pre-sets comprises dynamically adjusting one or more of the settings of one or more of the plurality of pre-sets, comprising:
  detecting changes initiated by the user that alter one or more of the environmental conditions affecting at least one of the user's driving preferences and the user's comfort;
  identifying the one or more of the plurality of pre-sets that correspond to the changes initiated by the user; and
  storing the adjusted one or more settings to correspond to the respective one or more of the plurality of pre-sets.

15. The method of claim 9, wherein the automatically detecting the settings for each of the plurality of pre-sets comprises monitoring over time the user's configuring of the environmental conditions such that the storing the adjusted one or more settings comprising storing the adjusted one or more settings after detecting the same changes initiated by the user to alter the one or more of the environmental conditions at least a threshold number of times prior to storing the adjusted one or more settings.

16. The method of claim 9, further comprising:
  receiving, from a user's portable consumer electronic device, standardized settings for one or more other pre-sets; and
  modifying the environment of the first automobile by applying the standardized settings of the one or more other pre-sets.

17. The method of claim 9, further comprising:
  communicating one or more of the standardized settings of the plurality of pre-sets to a user's portable consumer electronic device to be stored by the user's portable consumer electronic device.

18. An apparatus to configure an environment of an automobile, the apparatus comprising:
  a processor configured to interact with one or more systems within an automobile to modify an environment within the automobile; and
  processor readable memory accessible by the processor and configured to store program code;
  wherein the processor is configured, when implementing the program code, to:
  identify, through a controller of a first automobile configured to establish an environment of the first automobile, a first user of one or more potential users, wherein the identifying the first user comprises identifying that the first user is proximate the first automobile;
  access a first plurality of pre-sets that correspond to the first user, wherein each of the first plurality of pre-sets comprises a standardized setting, wherein the standardized settings of each of the first plurality of pre-sets is configured to be implemented in multiple different types of automobiles including the first automobile and at least one or more automobiles that have different available capabilities corresponding to at least one of automobile performance and user's comfort than the first automobile, wherein the first plurality of pre-sets are configured to achieve, when applied, substantially the same environmental conditions, relative to the pre-sets, in each of the different types of automobiles regardless of differences between the multiple different types of automobiles;
  automatically apply all of the first plurality of pre-sets without any user interaction such that each of the first plurality of pre-sets is applied at one time establishing the environment of the first automobile consistent with the first plurality of pre-sets that correspond to the first user;
  detecting a change initiated by the first user that alters the environment corresponding to a setting of a first pre-set of the first plurality of pre-sets and that affects at least one of the user's driving preferences and the user's comfort;
  identifying at least a second pre-set of the first plurality of pre-sets that is related to the first pre-set based on the standardization;
  automatically adjusting a setting of the second pre-set proportional to the change initiated by the user; and
  automatically applying the adjusted setting of the second pre-set without any further user interaction.

19. The apparatus of claim 18, wherein the processor, in identifying the first user, is configured to identify that the first user is assigned to the first automobile from a plurality of available automobiles.

20. A method of configuring an automobile environment of an automobile, the method comprising:
  identifying one or more pre-sets corresponding to a first automobile, wherein each pre-set of the plurality of pre-sets corresponds to automobile environmental conditions affecting one of a user's driving preferences and the user's comfort;
  automatically detecting one or more settings for each of the plurality of pre-sets;
  standardizing each of the settings of each of the plurality of pre-sets such that each of the settings is configured to be implemented in multiple different types of automobiles including the first automobile and at least one or more automobiles that have different available capabilities corresponding to at least one of automobile performance and user's comfort than the first automobile; and
  storing each of the standardized settings of each of the plurality of pre-sets such that the pre-sets are configured to be applied in configuring an automobile environment of the first automobile;
  wherein the standardizing each of the settings of each of the plurality of pre-sets comprises defining a first setting corresponding to a first pre-set as a distance relationship between a first seat within the first automobile and one or more other physical features within the first automobile; and
  wherein the standardizing each of the settings of each of the plurality of pre-sets comprises defining a second setting comprising one or more angular relationships corresponding to a surface of a mirror of the first automobile relative to one or more planes defined by one or more portions of the first seat.

* * * * *